United States Patent [19]

Holtz

[11] 4,365,293
[45] Dec. 21, 1982

[54] SERIAL COMMUNICATIONS BUS FOR REMOTE TERMINALS

[75] Inventor: Earl B. Holtz, Huntington, Conn.

[73] Assignee: Pitney Bowes Inc., Stamford, Conn.

[21] Appl. No.: 134,739

[22] Filed: Mar. 28, 1980

[51] Int. Cl.³ .............................................. G06F 3/04
[52] U.S. Cl. .................................................. 364/200
[58] Field of Search ... 364/200 MS File, 900 MS File; 340/147 R; 235/101

[56] References Cited

U.S. PATENT DOCUMENTS

| 3,308,439 | 3/1967 | Tink et al. | 364/200 |
| 3,676,846 | 7/1972 | Busch | 364/200 |
| 3,833,888 | 9/1974 | Stafford et al. | 364/200 |
| 3,975,712 | 8/1976 | Hepworth et al. | 340/147 R |
| 4,071,887 | 1/1978 | Daly et al. | 364/200 |
| 4,097,923 | 6/1978 | Eckert, Jr. et al. | 364/900 |
| 4,286,144 | 8/1981 | Pollak, Jr. et al. | 235/101 |

Primary Examiner—Harvey E. Springborn
Attorney, Agent, or Firm—Robert H. Whisker; William D. Soltow, Jr.; Albert W. Scribner

[57] ABSTRACT

A communication system is provided for use in an electronic accounting system. The system includes a plurality of remote terminals for data entry, a serial data bus, a universal synchronous/asynchronous receiver/transmitter (USART), a priority interrupt controller and a processor connected to the bus to allow processor controlled bidirectional communication over the bus.

8 Claims, 5 Drawing Figures

SERIAL COMMUNICATIONS BUS FOR REMOTE TERMINALS

BACKGROUND OF THE INVENTION

In recent years the historically minor expenses attributable to utilization of the mails have significantly increased as a result of both direct and indirect mailing costs. As these expenses continue to spiral upwardly, the mailing habits of major industries are coming under closer scrutiny with a view to controlling such expenses. In this connection, many major manufacturers of postage meters and systems, including the assignee of the present invention, have recently introduced lines of meterscale systems, which basically include a highly sensitive scale coupled to a postage meter which automatically prints the proper postage for franking the mailpieces weighed on the scale.

Other successful devices have been devised for reducing indirect mailing costs. For example, the assignee of the present invention recently introduced a system for remotely resetting postage meters to eliminate the labor costs which would otherwise be incurred for hand-carrying postage meters to the local Post Office for resetting purposes. Such a system is disclosed in U.S. Pat. No. 4,097,923, for example, assigned to the assignee of the present invention.

With the above thoughts in mind, it should be appreciated that there is a need in the marketplace to provide a suitable device for making a record of direct mailing costs on a current basis for cost analysis and other mail control purposes. In a typical office or corporate mailing room, a number of users have access to a single mailing machine and the postage meter associated therewith. In these situations, it is often desirable to account for the postage used by each person or department within the office. An automated system for providing this function is described in U.S. Pat. No. 4,286,144, issued to Pollak, Jr. et al., and assigned to the assignee of the present invention, the disclosure of which is hereby incorporated by reference.

In the apparatus of the above identified application, an encoder is shown for use with a postage meter. The encoder has a lever which is movable among a plurality of postage value selecting positions. The encoder includes framework adapted for removably mounting the encoder in operating relationship with respect to the postage meter, and includes devices for monitoring movement of the postage meter setting lever on the meter when the encoder is mounted in the operating relationship. The monitoring means includes apparatus includes devices for providing an electrical signal which varies in response to movement of the postage meter setting lever from one of the positions to another of the positions.

The encoder includes transducer assemblies which include a conventional variable linear potentiometer with a stationary linear resistance. As a postage meter setting lever is moved from one position to another, the resistance of the potentiometer varies, thus varying the value of the electrical signal.

The electrical signal generated by the potentiometer is converted by an analog to digital converter to a digital value. This value, as well as other data input by means of a keyboard to the accounting system, is stored in memory within the accounting system.

In practice, it is often desirable to maintain a record of a number of separate postage meters. These meters may be associated with diverse equipment, such as mailing machines, meter scales, electronic meters, and stand alone meters for use with the United States Postal Service (USPS) and for use with the United Parcel Service (UPS). In a given business environment, it is also often the practice to physically separate postage meters for use with different departments. A need therefore arose to handle a plurality of remote meters in one accounting system.

Moreover, for purposes of cost, effectiveness and efficiency, the required accounting system would preferably include a minimum number of components.

A common serial data bus to provide bidirectional communication among remote terminals and a central processing unit is well known in the art. Prior to the system of the present invention, however, separate driving circuitry was required to be associated with each of the external remote terminals. This practice of dedicating functionally identical driving circuitry, e.g. a line driver, a receiver/transmitter communications chip or other buffer, for each remote terminal is both costly and inefficient. The references discussed hereinbelow are illustrative of the prior art.

U.S. Pat. No. 4,041,469, issued to Jennings, shows a data processing system with a plurality of data entry terminals controlled by a CPU over a serial data bus. In this system, no universal synchronous/asynchronous receiver/transmitter (USART) is used nor is a priority interrupt controller provided to allow bidirectional communication between the CPU and individual terminals on a priority basis.

U.S. Pat. No. 4,106,104, issued to Nitta et al, teaches the use of a common bus connecting a plurality of devices, each of which is assigned a priority order. A detecting circuit is provided in one of the devices to detect a request signal. A unit for controlling the bus is connected thereto. This separate component receives requesting signals and sends an acknowledgement signal in response to the request signal. Although many interrupt requests may occur simultaneously, the same device will always be serviced first. No CPU or controller is used to arbitrate the priority of requesting devices.

U.S. Pat. No. 4,071,887, issued to Daly et al, discloses an integrated circuit synchronous adaptor (USART) for providing bidirectional communication. A bus is used to carry data to which a synchronization character or a fill character has been inserted or deleted. Parity generation and error checking is also performed by means of this bus. There is no mention, however, of a priority interrupt controller, nor is there any provision for a plurality of remote terminals.

U.S. Pat. No. 3,975,712, issued to Hepworth et al, shows receiving and transmitting circuitry for converting data in a serial format to parallel format. The communications interface allows data to be transferred asynchronously. There is no mention, however, of a priority interrupt controller.

SUMMARY OF THE INVENTION

There is provided in the present invention an electronic accounting system for maintaining records of the charges incurred in individual postage meters by each of a plurality of separate and distinct users. Data is transferred efficiently by the use of a serial data bus common to all components in the system. In addition, each of a plurality of remote terminals may be accessed for data without the need of individual driving circuitry for each of the remote terminals.

In accordance with the present invention, a communication system is provided for use in an electronic accounting system which includes a plurality of remote terminals for data entry. The communications system comprises a serial data bus, a plurality of data lines associated with each remote terminal, a USART connected to the bus, a priority interrupt controller connected to the bus, and a processor connected to the bus to allow bidirectional communication over the bus. The communications are controlled by the processor.

BRIEF DESCRIPTION OF THE DRAWINGS

As shown in the drawing wherein like reference numerals designate like or corresponding parts throughout the several figures.

DETAILED DESCRIPTION OF THE PREFERRED EMBODIMENT

Figure 1:
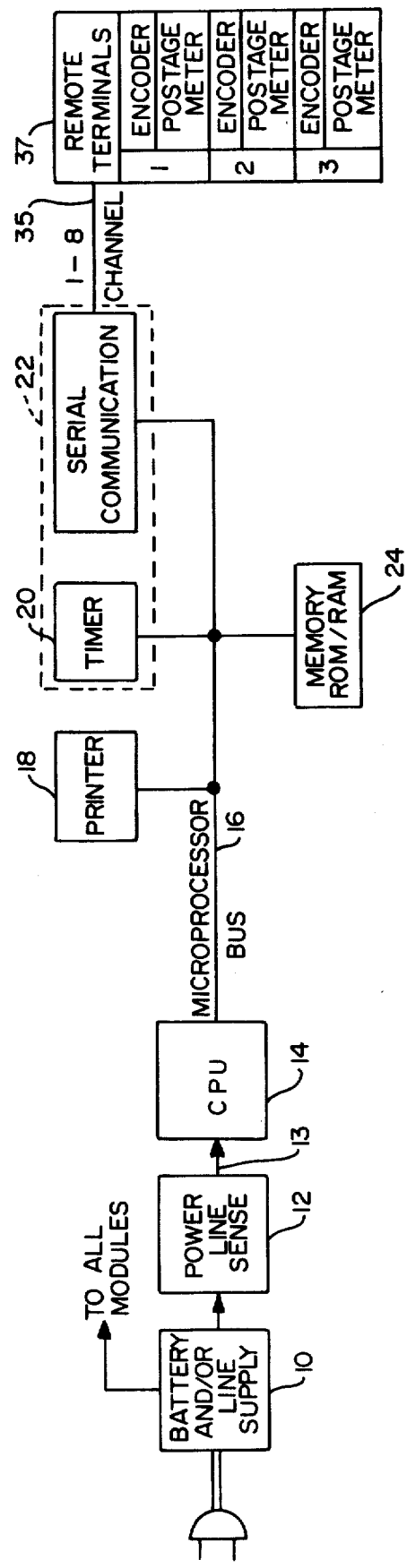
FIG. 1 is a block diagram of an electronic accounting system for postage data which includes a serial communications bus constructed in accordance with and embodying the invention.

Referring now to FIG. 1 a power supply 10 including two backup batteries, not shown, is connected to power line sense circuitry 12 which is comprised of opto-isolators, not shown. The power supply 10 is also connected to all other modules as hereinbelow identified in the system. The power line sensing circuitry 12 is connected over a line 13 to a main system processor 14, hereinafter referred to as a central processing unit (CPU) such as Model 8085 single chip 8-bit microprocessor manufactured by Intel Corporation.

A microprocessor bus 16 connects the CPU 14 to the following modules: a printer system 18 for use with the Model No. 410 printer manufactured by LRC Corporation; a timer 20 such as an Intel 8155; serial communications channels 22; and memory 24 comprising read only memory (ROM) and random access memory (RAM).

Serial communications channels 22 can be connected to up to eight remote terminals 37 over a 1-8 communications channel bus 35. The remote terminals may comprise a postage meter and encoding devices such as that of U.S. Pat. No. 4,286,144 available from Pitney Bowes Inc. of Stamford, Conn. The terminals receive data from postage meters, scales and electronic postage meters, accumulate such data and transmit the data to a main terminal.

Figure 2:
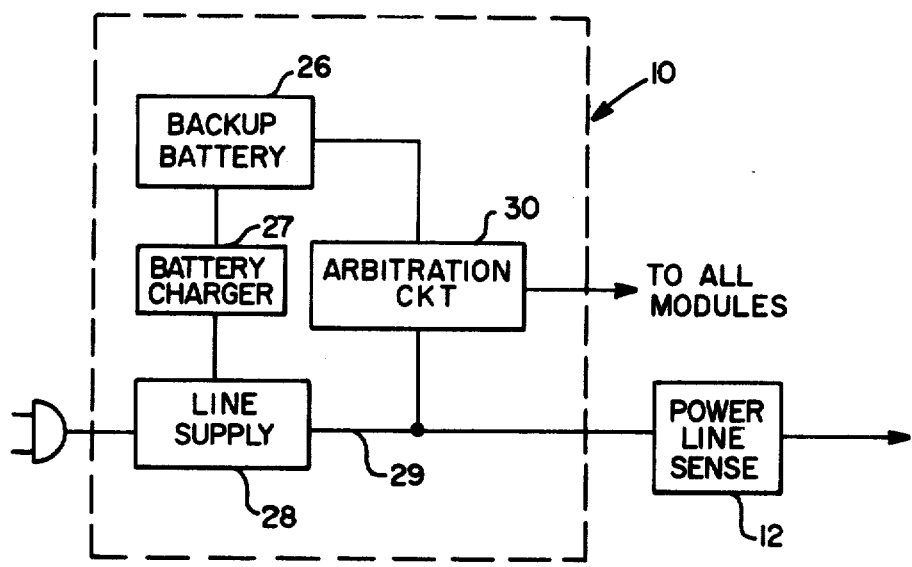
FIG. 2 is a block diagram of the power supply.

Referring now also to FIG. 2, the power supply shown by reference numeral 10 comprises two backup batteries shown generally as reference numeral 26. The power supply 10 also contains a line power supply 28 connected directly to a source of AC power, not shown. Battery chargers 27 are connected between the backup batteries 26 and the line power supply 28. Both the backup batteries 26 and the line power supply 28 are connected to an arbitration circuit 30 which connects all modules either to the line power supply 28 or to the backup batteries 26, depending on whether AC line power is present. The power line sense circuitry 12 is connected to the line power supply 28 in the power supply 10.

Figure 3:
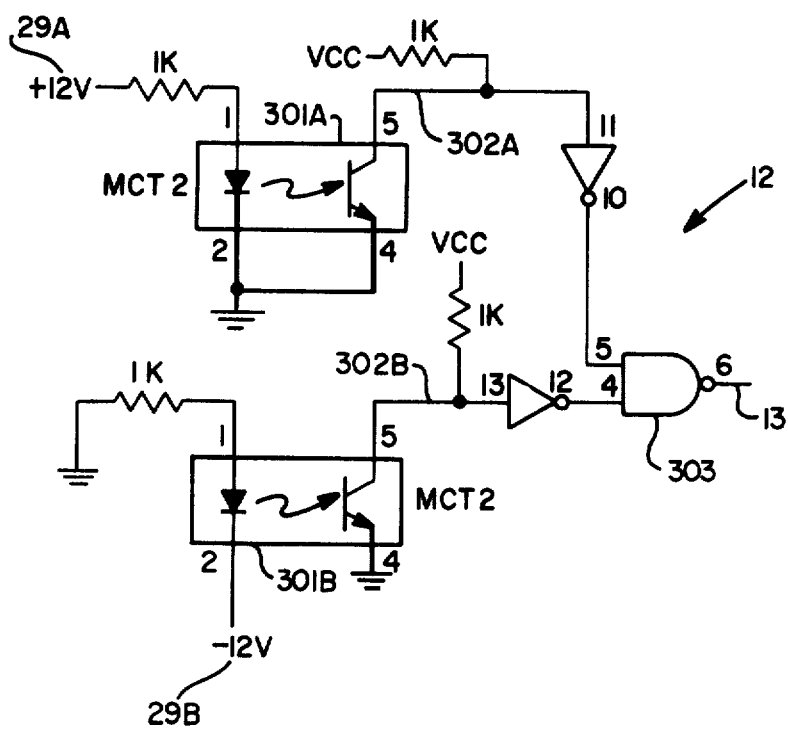
FIG. 3 is an electrical schematic diagram of the power line sensing circuit.

Referring now to FIG. 3, the components incorporated in the power line sensing circuitry 12 are shown. Two outputs from the line supply 28 (FIG. 2) are shown as reference numerals 29A and 29B in FIG. 3. Both outputs are commonly referred to in FIG. 2 as reference numeral 29. The power from each output 29A and 29B is sensed by opto-isolators 301A and 301B, respectively. The output signals 302A and 302B from each opto-isolator 301A and 301B, respectively, are logically, "ANDed" by gate 303 to provide a power fail signal over line 13.

Figure 4:
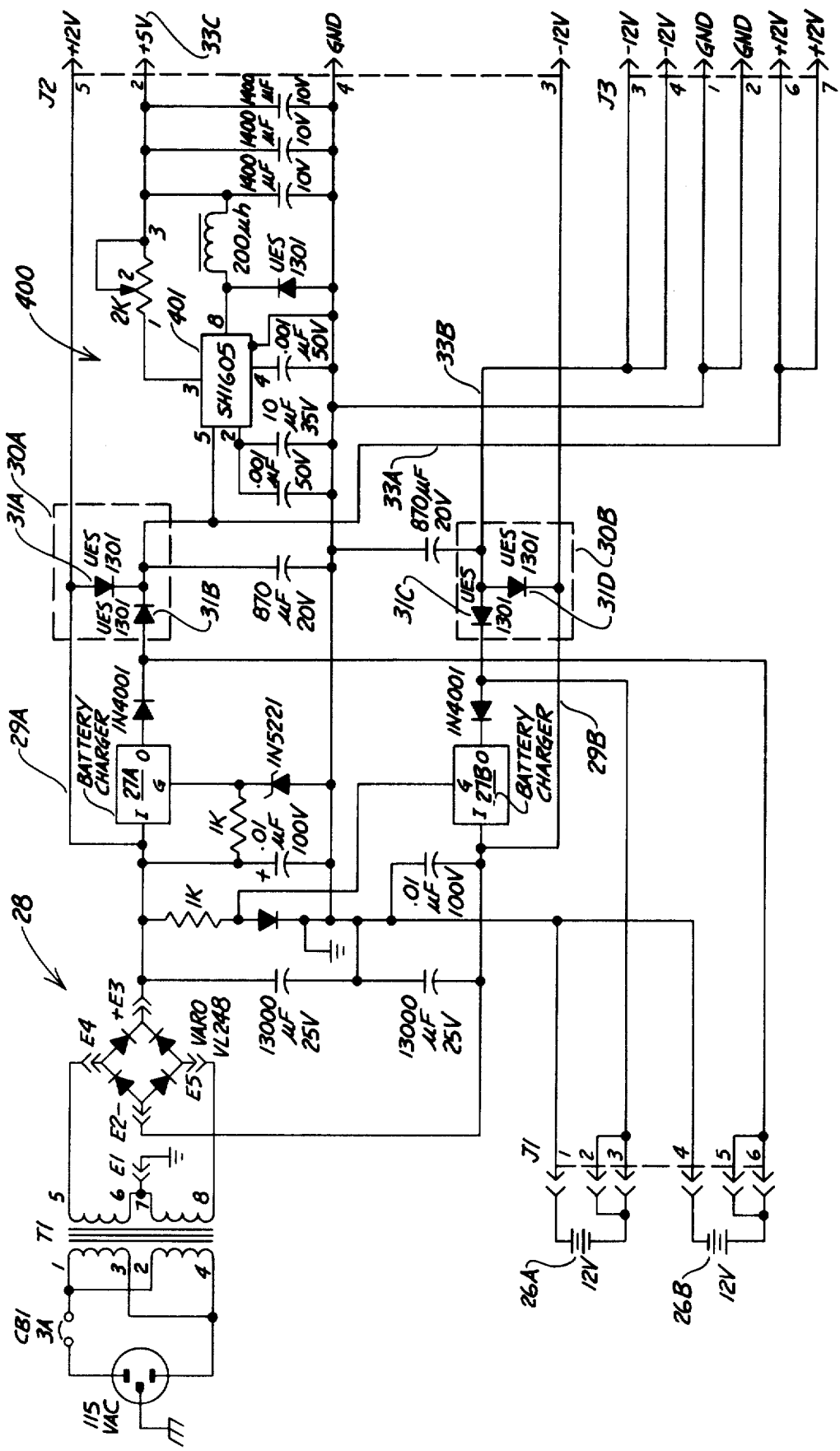
FIG. 4 is an electrical schematic diagram of the power supply circuit.

Referring now also to FIG. 4, the power supply 10, including the batteries 26A and 26B, line power supply 28 and arbitration circuit 30, are shown. The batteries 26A and 26B are commonly referred to as reference numeral 26 in FIG. 2.

Two battery chargers 27A and 27B are used to charge the batteries 26A and 26B respectively when AC power is supplied over the line power supply 28. Both battery chargers 27A and 27B are commonly referred to as reference numeral 27 in FIG. 2.

AC power is normally supplied to the line power supply 28 from an external source. The line power supply 28 is connected by lines 29A and 29B to two arbitration circuits 30A and 30B which consist of two separate sets of two diodes in each set, shown as reference numerals 31A, 31B, 31C, and 31D. These diodes are used to logically "OR" the lines 29A and 29B and the corresponding batteries 26A and 26B to provide power lines 33A, 33B and 33C to supply energy to power the other modules in the system. Power line 33A also supplies power to a switching regulator power supply 400 which includes a switching regulator IC chip 401 such as the Model SH1605 switching regulator supplied by Fairchild Corp., the output of which is the power line referred to as reference numeral 33C.

The switching regulator power supply 400 is used to provide an efficient means of generating 5 volts from either the AC power or battery supply 26. Also, when power is being supplied by batteries 26, the duty cycle of the switching regulator power supply 400 allows power to be drawn from the battery 26 in pulses, thus extending the useful charge time of the battery 26.

Figure 5:
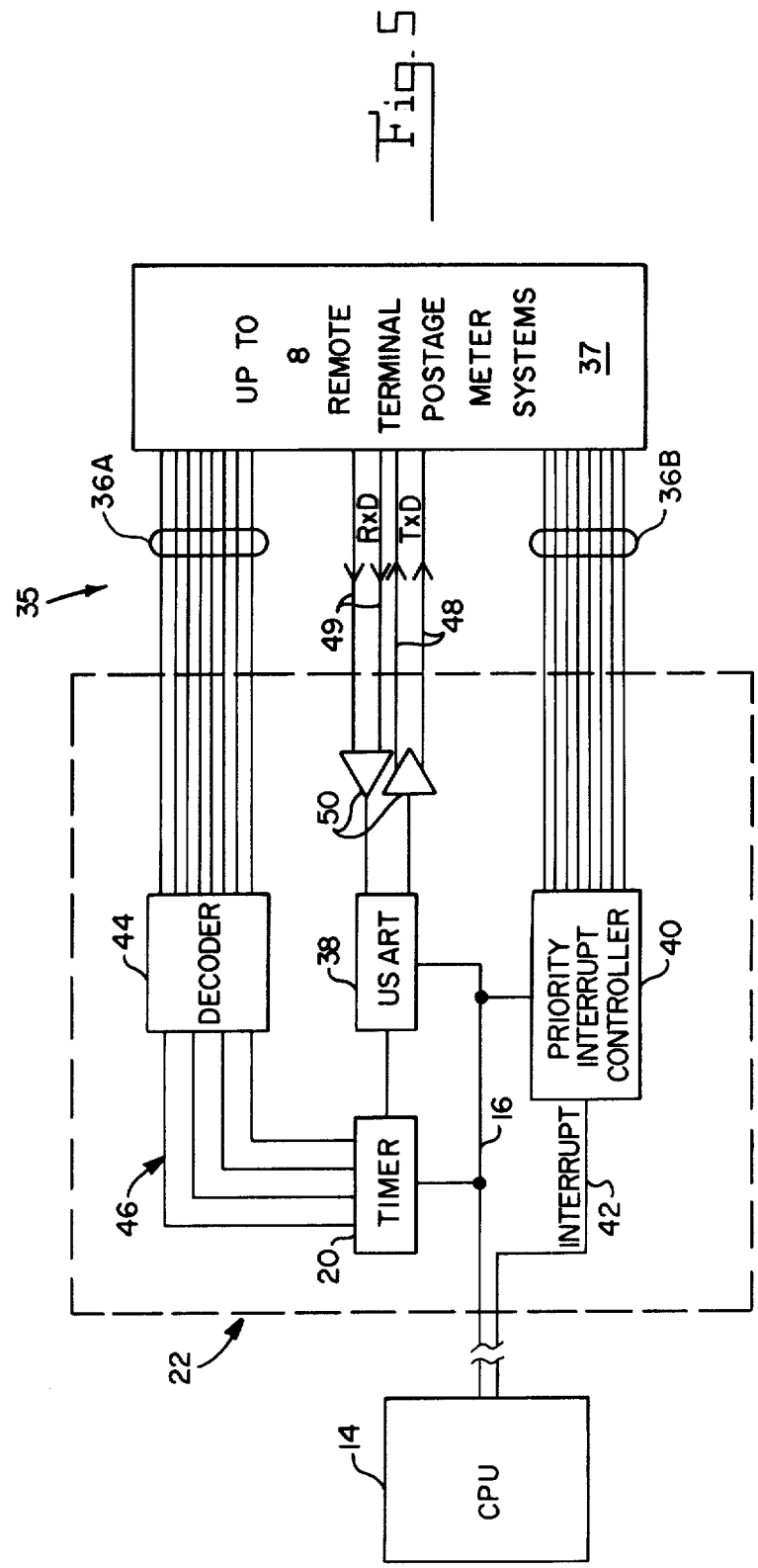
FIG. 5 is a block diagram of a portion of the accounting system showing further details of the serial communications bus.

Reference should now be made to FIG. 5, which shows the serial communications channel 22 as part of the postage meter accounting system of the present invention. The timer, shown as reference numeral 20, actually serves two functions and appears separately in FIG. 1 and FIG. 5 to indicate its different functional relationship to the modules.

The CPU 14 is connected by means of the microprocessor bus 16 to the timer 20, and to a universal synchronous/asynchronous receiver/transmitter (USART), such as Model No. 8251 manufactured by Intel Corporation, and to a priority interrupt controller 40, such as Model No. 8259 manufactured by the Intel Corporation. An interrupt line 42 also connects the CPU 14 to the priority interrupt controller 40. The interrupt controller 40 is under software control and priority is determined on a rotating basis. A decoder 44, such as Model No. 74LS42 manufactured by National Semiconductor Corporation, is connected over four I/O lines 46 to the timer 20.

The 1-8 communications channel bus 35, as shown in FIG. 1 and FIG. 5 can include up to 20 lines, excluding ground reference lines, not shown. These 20 lines consist of: up to eight I/O status lines referred to as reference numeral 36A; four data lines 48 and 49; and up to eight I/O status lines 36B. The phrase "I/O channel" as hereinafter used is defined as one 36A line, two 48 lines, two 49 lines and one 36B line.

Eight individual I/O lines referred to as numeral 36B are sent to the priority interrupt controller 40 as request to send (RTS) lines. Similarly, the I/O lines from the decoder 44 are sent to the eight I/O lines 36A individually as clear to send (CTS) lines. Each one of I/O lines 36A and each one of I/O lines 36B is connected to only one of the eight remote terminals 37.

There are two sets of data lines 48 and 49 to provide a party line capability. These data lines 48 and 49 are commonly connected to all terminals 37. That is, lines 49 are connected to all eight terminals 37 to receive data therefrom and lines 48 are connected to all eight terminals 37 to transmit data thereto. Buffers 50 are provided between the lines 48 and 49 and the USART 38.

In operation, a record of transactions for each of up to eight postage meters 37, each having at least one individual account, can be maintained by the CPU 14. In the event of a line power failure, the power line sensing circuitry 12 signals the CPU 14 that such a condition is present. The CPU 14 then signals the timer 20 over the microprocessor bus 16 to begin a timing measurement operation. If power is reinstated to the system over the line power supply 28 within an arbitrary length of time (e.g., 30 minutes), then the power down routine is halted. The timer 20 is reinitialized at that point. The arbitration circuit 30 then connects the line power supply 28 to the modules over lines 33A, 33B and 33C and disconnects the batteries 26A and 26B.

After the 30 minute time interval has elapsed, the timer 20 times out and sends a signal over the microprocessor bus 16 to the CPU 14 apprising the CPU 14 of that fact. The CPU 14 then performs a data dump of all the data in the RAM portion of the memory 24. This data is transferred over the microprocessor bus 16 to an external device. The external device may be either a printer 18 or another peripheral device connected to the microprocessor bus 16 directly in place of, or in addition to the printer 18. The RAM data may be dumped to one of eight external devices shown generally as reference numeral 37, and connected to the serial communications channel 22, over one of eight channels shown generally at 35.

One of the remote terminals 37 generates a request to send (RTS) signal to the priority interrupt controller 40, which controller interrupts processing of the CPU 14 over interrupt line 42. The CPU 14, now apprised of a request by a remote terminal, sends a signal over the microprocessor bus 16 through the timer 20 over lines 46 to the decoder 44, which decoder 44 then transmits a clear to send (CTS) signal to the proper remote terminal 37.

This communications link ties the main terminal, which houses the CPU 14, to the remote terminals 37 over lines 35. The remote terminals 37 transfer commands and data over the receive data line 49 through the buffer 50 to the USART 38 which in turn relays this data over the microprocessor bus 16 to the CPU 14.

The priority interrupt controller 40 determines the identity of the remote terminal 37 that has requested the communications channel. The CPU 14 can respond to the requesting terminal's signal over the microprocessor bus 16 through the USART 38, the corresponding buffer 50 and over the transmit data lines 48. In this way, one USART 38 can be used to communicate with any one of eight individual remote terminals 37 as identified by the priority interrupt controller 40 and further identified by the decoder 44. The single USART functions not only for serial to parallel conversion of data from a remote 37 to the CPU 14 and parallel to serial conversion from the CPU 14 to a remote 37; but since the remote terminals 37 are asynchronous with respect to the CPU 14, the USART synchronizes communication between the remotes and the CPU 14. Attention is directed to the Baud rate synchronization line between the timer 20 and the USART and illustrated in FIG. 5.

It should be noted that the driving circuitry common to all remote terminals not only includes the single USART 38 shared by all data lines but the driver buffer 50 associated with the transmit lines 48 and the receiver buffer 50 associated with the receive lines 49.

Once the CPU 14 has completed the request to the individual remote terminal 37, the communication line 36A from the decoder 44, which generates clear to send (CTS) signals, is disconnected. The specified remote terminal 37 then disconnects its associated 36B line, thereby freeing its channel. The remote terminal 37 is then disengaged to allow another remote terminal 37 to request service over one of the request to send (RTS) lines 36B connected to the priority interrupt controller 40. At this point the process can be repeated.

It can be seen from the above disclosure that a novel communication system has been provided for use in an electronic accounting system with a plurality of remote terminals for data entry. The system comprises a processor, a data bus, only one USART, and a priority interrupt controller for allowing processor controlled bidirectional communication over the bus.

It should be understood that the term postage meter is used herein to refer to the general category of devices for imprinting a defined unit value for governmental or private carrier delivery of envelope or parcels, or other like application for unit value printing. Thus, the term is used as a general term for devices utilized in conjunction with services other than those exclusively employed by governmental postal services. The term encompasses, for example, private parcel or freight service meters.

Inasmuch as certain changes may be made in the above described invention without departing from the spirit and scope of the same, it is intended that all matter contained in the above description or shown in the accompanying drawings shall be interpreted in an illustrative rather than limiting sense. Moreover, it is intended that the following claims be interpreted to cover all the generic and specific features of the invention herein described.

What is claimed is:

1. A postage data processing system including a plurality of remote postage data entry stations, said system comprising:

(a) main processing means for maintaining a record of postage data;

(b) a serial data bus, the data bus including a plurality of first status lines for initiating communication, each of the status lines being operatively connected to a different entry station and a plurality of shared data lines for data transfer between each of the entry stations and the main processing means, each entry station being operatively connected to and sharing the data lines; and (c) communication means operatively connected between the main processing means and said data bus for allowing said main processing means to communicate over said data bus with only one of said plurality of data entry stations at a given time, said communication means including controller means communicating with the first status lines for assigning the priority of each of said plurality of data entry stations attempting to communicate over said data bus on a rotating basis and for selecting the data entry station having the highest priority for communication with the main processing means over said data lines, the communication means further including common driving circuit means associated with each of the shared data lines, the entry stations being free of individual driving circuitry associated with the data lines.

2. A postage data processing system constructed in accordance with claim 1 wherein the controller means comprises a priority interrupt controller, the priority interrupt controller including means for generating an interrupt signal, the main processing means receiving the interrupt signal and in response thereto initiating a communications link with the entry station of highest priority.

3. A postage data processing system constructed in accordance with claim 1 wherein the main processing means is adapted for communications at a determined synchronous rate, the entry stations being adapted for communications at rates which are asynchronous to that of the main processing means, the driving circuit means including a synchronous/asynchronous receiver/transmitter, means operatively connecting the receiver/transmitter to the main processing means and means operatively connecting the receiver/transmitter means to the data lines.

4. A postage data processing system constructed in accordance with claim 3 wherein the driving circuit means includes buffer means, and the means operatively connecting the receiver/transmitter to the data lines includes the buffer means.

5. A postage data processing system constructed in accordance with claim 1 further including a like plurality of second status lines, each of the second status lines being operatively connected to a different entry station and means operatively interconnecting each of the second status lines to the main processing means for transmission of an acknowledgement signal from the main processing means to a selected data entry station, the data entry station receiving the acknowledgement signal and in response thereto transmitting data through the shared data lines.

6. A postage data processing system constructed in accordance with claim 5 wherein the means interconnecting the second status lines and the main processing means comprises a decoder.

7. A postage meter accounting system for recording metered postage amounts chargeable to accounts comprising:
(a) a plurality of remote terminals, each terminal having at least one postage meter and postage encoding means operatively connected thereto;
(b) a serial data bus, the bus comprising
  (i) a plurality of status lines, each line of said plurality being connected to one of said plurality of remote terminals for requesting permission to transmit postage accounting data and
  (ii) a plurality of data lines, each data line being operatively connected to and shared by each remote terminal;
(c) a central processing means coupled to said plurality of data lines, said processing means being operative to control data communications over the data lines;
(d) priority interrupt controller for determining the priority of status line signals on a rotating basis, the controller being operatively connected to said plurality of status lines and to said processing means, the controller receiving a signal along one of the status lines and in response thereto interrupting the processing means and selecting the remote terminal of highest priority;
(e) a single receiver/transmitter means operatively connected between said processing means and all data lines for coordinating bidirectional communications between said processing means and the selected remote terminal; and
(f) buffer circuit means operatively connected between the receiver/transmitter means and each data line, the remote terminals being free of buffer circuit means associated with the data lines.

8. The postage meter accounting system of claim 7 wherein the serial data bus further includes
(iii) a plurality of second status lines for signalling one of said terminals to transmit data, each second status line being operatively connected between said central processing means and one of said terminals.

* * * * *